July 18, 1933.  E. H. REMDE  1,918,289
INDUSTRIAL TRUCK
Original Filed Oct. 29, 1927   2 Sheets-Sheet 1
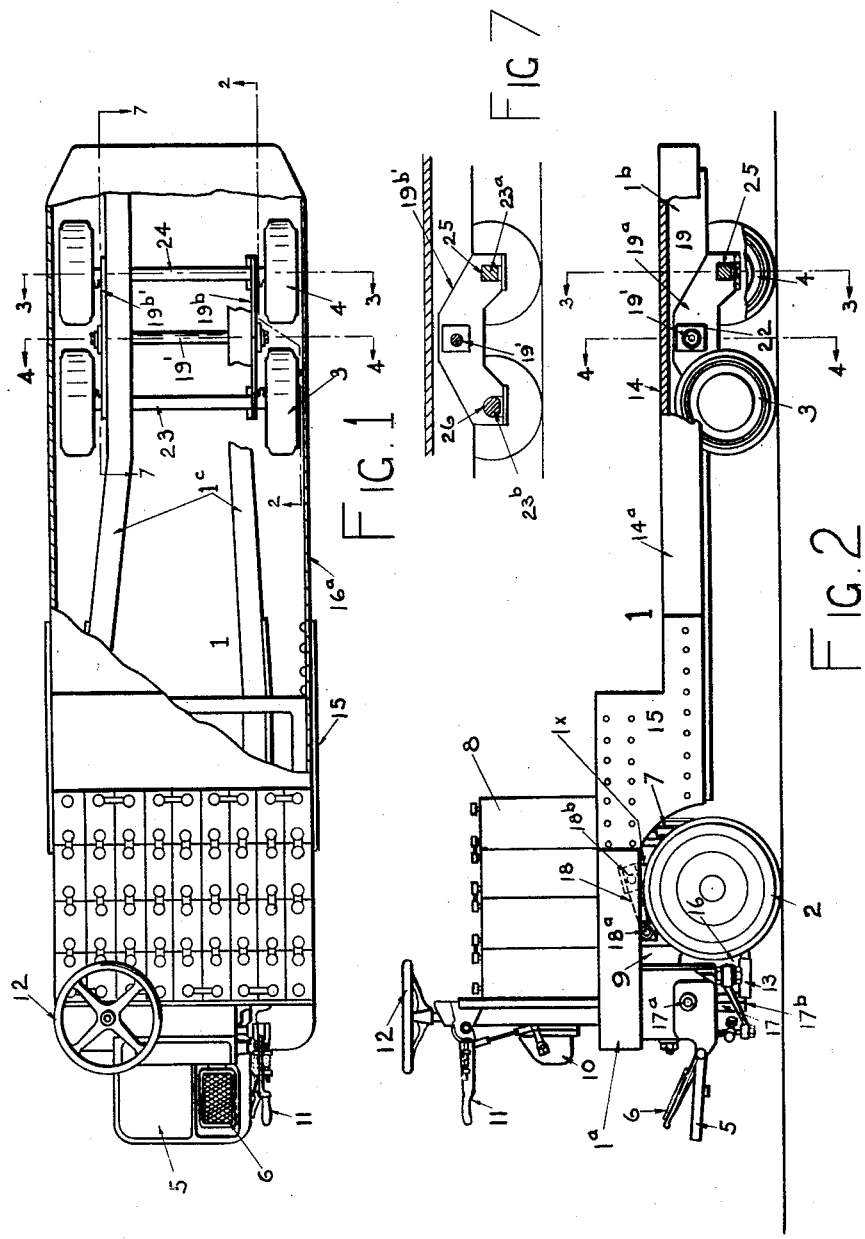
INVENTOR.
Edward H. Remde
BY
ATTORNEY.

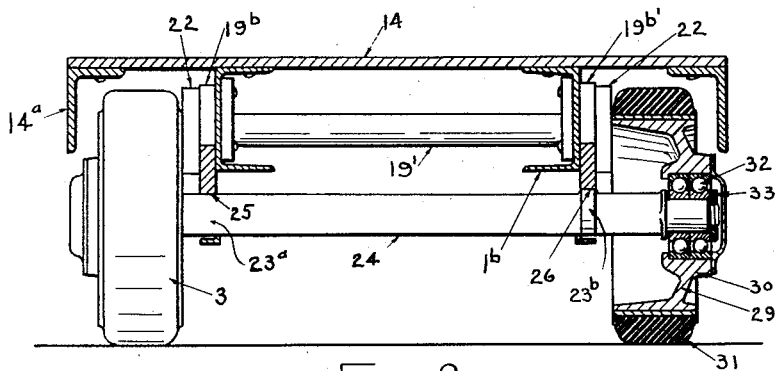
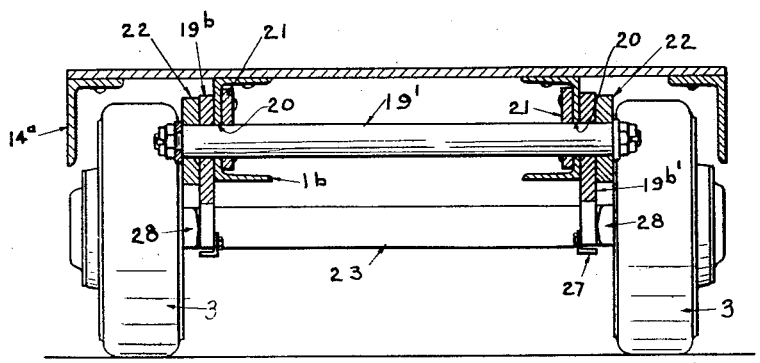
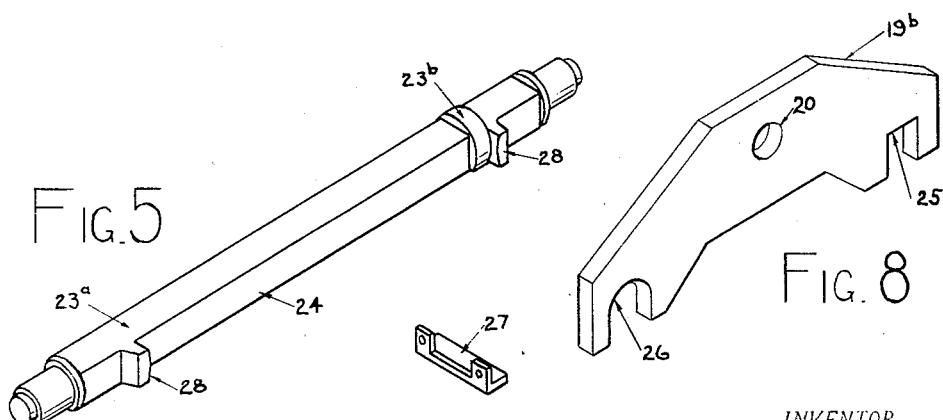

Patented July 18, 1933

1,918,289

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed October 29, 1927, Serial No. 229,578. Renewed April 8, 1932.

This invention relates to an industrial truck, more particularly a truck capable of carrying or transporting loads.

One object of the invention is to construct a truck capable of carrying relatively heavy loads.

Another object of the invention is to construct an improved truck capable of carrying loads of varying sizes with respect to weight or cubical dimensions with less danger of tilting the loads when passing over uneven surfaces, whereby materials and bodies may be transported safely and at greater speeds.

A further object of the invention is to so mount the truck frame upon the traction wheels and load supporting wheels, that stresses on the frame, when the truck is being driven over rough surfaces, either with or without a load, are reduced to a minimum.

Another object of the invention is to so mount the load carrying wheels that (1) they may accommodate themselves independently to uneven surfaces and (2) stresses on the axles and the supporting members therefor when passing over such surfaces are eliminated.

Another object of the invention is to provide an improved truck that is relatively simple and cheap in construction.

Other objects of the invention will be apparent to those skilled in the art to which my invention relates from the following description taken in connection with the accompanying drawings, wherein Fig. 1 is a plan view of a truck embodying my invention, parts being broken away.

Fig. 2 is a side view of the truck, partly in section on the line 2—2 of Fig. 1.

Fig. 3 is a transverse section on the line 3—3 of Fig. 1.

Fig. 4 is a transverse section on the line 4—4 of Fig. 1.

Figs. 5 and 6 are perspective views; one showing one of the axles for a pair of the load supporting wheels and the other showing a retaining clip or device.

Fig. 7 is a fragmentary section on the line 7—7 of Fig. 1.

Fig. 8 is a perspective view of one of the sub-frame members.

In the drawings, 1 indicates a frame of suitable construction having at and below one end, a pair of steerable traction wheels 2 and at and below its opposite end a plurality of relatively movable wheels 3, 4, disposed in pairs and preferably non-steerably mounted. Each of the wheels 3, 4, is preferably relatively wide. The frame 1 comprises a horizontal section 1a and a load carrying section 1b. The mountings for the wheels 2, 3, 4, (which mountings will be later described) co-operate to eliminate strains on the truck frame and to maintain the frame stable and substantially level when any pair of wheels or one or more of the wheels are riding any obstruction or entering and riding out of a depression, so that loads of varying sizes may be more readily handled and the truck operated at relatively high speeds.

5 indicates a platform on which the driver or operative stands. 6 indicates a pedal adapted to release a brake 7 on an extended inner end of the propeller shaft of a driving motor 9. 8 indicates the batteries supported on the frame section 1a and supplying current to the driving motor 9. 10 indicates a controller for the circuit to the motor 9. 11 indicates a lever for operating the controller. 12 indicates a steering device, such as a wheel, connected to a steering column, which in turn operates through suitable connections, indicated as an entirety at 13, to steer the wheels 2.

The frame section 1b comprises the spaced frame members 1c and a platform 14 supported on the members 1c and preferably connected thereto in any well known way. Where the platform is stationary, the side flanges or reinforcing members 14a of the platform may be connected to the frame 1 by plates 15.

The wheels 2 are mounted on suitable knuckles at the opposite ends of an axle having a housing enclosing a power transmitting mechanism of any suitable type. The axle housing extends outwardly, as shown at 16 and forms a cradle for the driving motor 9. The shaft of the motor 9 is connected through a propeller shaft with the power transmitting mechanism. The motor 9 and the wheel axle are connected with the frame 1 by a pair of members 17, 18, the former member being trunnioned at 17a on brackets depending from the frame and connected to the outer end of the housing 16 by a universal joint 17b and the latter member being trunnioned on the frame at 18a and connected to the opposite end of the housing at 18b, so that relative movement between the axle and motor and the frame, incident to rough surfaces over which the truck is driven, may take place and permit the tractive effort of the wheels 2 to be maintained at all times. This mounting also permits the wheels 2 to accommodate themselves to uneven surfaces without tilting the truck frame, except slightly if at all. 1x indicate casings (only one being shown) for suitable coiled springs (not shown) between the outer portion of the wheel axle and frame section 1a.

The arrangement of the connecting members 17, 18, and their connections with the truck frame and axle housing are preferably similar to corresponding parts and the connections therefor shown in Letters Patent No. 1,628,145 granted to John H. Hertner and myself jointly so that a detailed illustration and description of these parts are not necessary herein.

19 indicates as an entirety the mounting for the wheels 3, 4. Of this mounting, 19a indicates a walking beam or sub-frame trunnioned on a fixed transverse shaft 19' carried by the frame section 1b. The walking beam or sub-frame 19a may comprise a pair of members 19b, 19b', disposed on the outer sides of the frame members 1c and rotatably mounted on the opposite ends of the shaft 19' which extends through aligned openings 20 formed in these members (see Fig. 4). The walls surrounding the openings 20 are preferably reinforced by plates 21; and the walls forming the openings in the members 19b, 19b', for the shaft 19' are reinforced by plates 22. The opposite ends of the members 19b, 19b', are extended downwardly and have mounted on them the opposite ends of axles 23, 24, for the wheels 3, 4, respectively. As the members 19b, 19b', are trunnioned on the shaft 19', they rock thereon when either pair of wheels passes over a ridge or into and out of a recess. The mountings on the members 19b, 19b', for the axles 23, 24, are such that the rockable members 19b, 19b', may swing one relative to the other, when either wheel of each pair rides over an obstruction or enters and rides out of a depression in the surface without causing disengagement of the remaining load wheels (or any thereof) from the surface; the result being that the tilting effect or inclination of the platform 14 while any wheel is passing over an uneven surface is reduced materially so that danger of the load tipping is substantially eliminated. To secure these advantages, one end portion of each axle has a non-circular section 23a (preferably square in cross section) which fits a correspondingly shaped recess 25 formed in one end of one of the members 19b, 19b', (for example 19b as shown in Fig. 3) to prevent rotation of the axle end relative to the adjacent rockable member (19b) and the opposite end portion of the axle has a round section 23b, which rotatably fits a recess 26, to permit rotation of the axle end relative to the adjacent rockable member (19b'). The non-rotatable and rotatable mountings of one axle are preferably reversed with respect to the other axle. Each end portion of each axle 23, 24, is held in its recess formed in the member 19b or 19b' by a clip (such as an angle 27) or other suitable device bridging the open end of the recess and secured to the adjacent rockable member by cap screws. The mountings for the axles just described permit any one or more of the wheels 3, 4, to freely accommodate themselves to uneven surfaces independently of each other and the remaining wheels and insure relative movement between the members 19b, 19b', so that strains on the axles and the walls of their receiving recesses are eliminated. Each axle 23, 24, is provided with laterally extending devices 28 which engage the outer sides of the rockable members 19b, 19b', to prevent endwise movement of the axle.

The wheels 3, 4, are relatively small so that they may be mounted below and within the sides of the platform 14. Each preferably comprises a web 29 having a hub 30 and a rim of suitable width carrying a tire 31. 32 indicates anti-friction bearings between the hub 30 and free end of the adjacent axle, being held in position by a nut 33 on the axle end.

In the construction of mounting for the wheels 2 herein shown, relative movement between the wheels and axle and the frame may take place on an axis cutting the universal joints 17b, 18b, so that the wheels 2 may accommodate themselves to uneven surfaces; likewise the mounting of the load wheels on a rocking sub-frame and the mounting of the axles for these wheels on the sub-frame members to permit of independent movement of the wheels enable these wheels to accommodate themselves to uneven surfaces as the truck is driven from place to place. It will thus be seen that by reason of each of these mountings tendency of the truck frame to tilt is materially reduced, when either or both driving wheels or any one or more load carrying wheels are riding an uneven surface; also, when both the driving and load carrying wheels are simultaneously riding uneven surfaces the mountings will co-operate to prevent undue strains on the frame.

By using a plurality of pairs of load carrying wheels sufficient rubber may be provided to sustain a relatively heavy load and the load is distributed over a large area of the floor surface.

To those skilled in the art to which my invention relates many changes in construction and widely differing embodiments and applications of the invention will suggest themselves without departing from its spirit and scope. My disclosures and the description herein are purely illustrative and are not intended to be in any sense limiting.

What I claim is:

1. In apparatus of the class described, the combination of a frame having a relatively low load supporting section at one end, a pair of steerable wheels for supporting the opposite end of said frame, a mounting between the axle for said steerable wheels and said frame to permit relative movement between the axle and frame, pairs of load supporting wheels below said load supporting section arranged in spaced relation longitudinally of said frame, and a mounting for said load supporting wheels permitting them to independently move vertically relative to each other, the last mentioned mounting comprising a pair of members independently trunnioned on a fixed, transverse axis disposed between said pairs of wheels to permit movement of said members relatively to each other and axles for said pairs of wheels, each axle being non-rotatively connected to one member and rotatively connected to the other member.

2. In apparatus of the class described, the combination of a frame having a relatively low load supporting section at one end, a pair of steerable wheels for supporting the opposite end of said frame, a mounting between the axle for said steerable wheels and said frame to permit relative movement between the axle and frame, pairs of load supporting wheels below said load supporting section arranged in spaced relation longitudinally of said frame, and a mounting for said load supporting wheels permitting them to independently move vertically relative to each other, the last mentioned mounting comprising a pair of members independently trunnioned on a transverse axis to move relatively to each other and axles for said pairs of wheels, each axle being non-rotatively connected to one member and rotatively connected to the other member, said connections for one axle with said members being reversed with respect to corresponding connections for the other axle with said members.

3. In a truck construction, the combination of a frame having a main portion and a load supporting portion, a platform on said load supporting portion, a pair of steerable wheels below said main portion, pairs of relatively small load wheels below and inwardly of the side edges of said platform, a shaft fixedly mounted on said load supporting portion in a transverse plane disposed between said pairs of load wheels, a pair of spaced members independently trunnioned on said shaft, and axles for said load wheels carried by the outer ends of said trunnioned members, one end of each axle being non-rotatively mounted in the adjacent end portion of one of said members and its opposite end being rotatively mounted in the corresponding end portion of the other member.

4. In a truck construction, the combination of a frame having a main portion and a load supporting portion, a platform surmounting said load supporting portion, a pair of steerable wheels below said main portion, pairs of relatively small load wheels below and inwardly of the side edges of said platform, a shaft fixedly mounted on said load supporting portion in a transverse plane disposed between said pairs of load wheels, a pair of spaced members independently trunnioned on said shaft, axles for said load wheels carried by the outer ends of said trunnioned members, one end of each axle being non-rotatively mounted in the adjacent end portion of one of said members and its opposite end being rotatively mounted in the corresponding end portion of the other member, and means between said trunnioned members and each axle arranged to prevent endwise movement of the latter.

5. In a truck construction, the combination of a frame having a main portion and a load carrying portion, a platform surmounting said load carrying portion, pairs of load wheels, a shaft fixedly mounted on said load carrying portion in a transverse plane disposed between said pairs of load wheels, a pair of members independently trunnioned on said shaft, and axles for said load wheels each having pivotal connection at their opposite end portions with corresponding ends of said members, whereby the latter are free to move independently, the pivotal connection at one end of each axle being arranged to prevent rotation thereof relative to the adjacent member and the pivotal connection at the opposite end of each said axle permitting it to rotate relative to the adjacent member.

6. A truck as claimed in claim 5 in which the said pivotal connections for one axle are reversed with respect to the pivotal connections for the other axle.

7. A truck as claimed in claim 5 in which means are provided for preventing endwise movement of each said axle relative to said members.

EDWARD H. REMDE.